US 8,089,567 B2

(12) United States Patent
    Chung

(10) Patent No.: US 8,089,567 B2
(45) Date of Patent: Jan. 3, 2012

(54) METHODS AND SYSTEMS FOR DISPLAYING VIDEO ON AN ADJUSTABLE SCREEN

(75) Inventor: Yau Wing Chung, Fremont, CA (US)

(73) Assignee: Optoma Technology, Inc., Milpitas, CA (US)

( * ) Notice: Subject to any disclaimer, the term of this patent is extended or adjusted under 35 U.S.C. 154(b) by 914 days.

(21) Appl. No.: 11/249,256

(22) Filed: Oct. 14, 2005

(65) Prior Publication Data
    US 2007/0024763 A1    Feb. 1, 2007

Related U.S. Application Data

(60) Provisional application No. 60/703,433, filed on Jul. 29, 2005.

(51) Int. Cl.
    H04N 11/00    (2006.01)
    H04N 5/46     (2006.01)
    H04N 5/14     (2006.01)
    H04N 9/74     (2006.01)
    H04N 3/22     (2006.01)
    H04N 3/26     (2006.01)

(52) U.S. Cl. ........ 348/745; 348/460; 348/558; 348/604; 348/581; 348/556

(58) Field of Classification Search ............ 348/745, 348/806, 580, 581, 575, 604, 558, 461, 465, 348/467, 460, 556; 353/69
    See application file for complete search history.

(56) References Cited

U.S. PATENT DOCUMENTS

| | | | |
|---|---|---|---|
| 5,146,331 A | | 9/1992 | Tsuchida |
| 5,175,627 A | * | 12/1992 | Josephs ................. 348/841 |
| 5,264,929 A | | 11/1993 | Yamaguchi |
| 5,323,235 A | | 6/1994 | Tonomura |
| 5,343,238 A | * | 8/1994 | Takata et al. ........... 348/556 |
| 5,343,257 A | * | 8/1994 | Kohno et al. ........... 348/842 |
| 5,442,406 A | * | 8/1995 | Altmanshofer et al. ...... 348/588 |
| 5,481,299 A | | 1/1996 | Coffey et al. |
| 5,521,658 A | * | 5/1996 | Donohoe ................ 353/98 |
| 5,523,880 A | * | 6/1996 | Pidgeon et al. .......... 359/450 |
| 5,526,066 A | * | 6/1996 | Kikuchi ................. 348/841 |
| 5,572,263 A | | 11/1996 | Kim et al. |
| 5,737,123 A | * | 4/1998 | Donohoe ............... 359/450 |
| 5,795,046 A | | 8/1998 | Woo |
| 5,801,767 A | * | 9/1998 | Wu .................... 348/190 |
| 5,949,494 A | | 9/1999 | Yamagata |
| 5,990,970 A | * | 11/1999 | Choi .................. 348/556 |
| 6,122,018 A | | 9/2000 | Sugihara et al. |

(Continued)

OTHER PUBLICATIONS

Dustin Sorenson, Current Video Projector Technologies, DELL White Paper, Jun. 2002, pp. 1-9.

*Primary Examiner* — Brian Yenke
(74) *Attorney, Agent, or Firm* — MH2 Technology Law Group LLP

(57) ABSTRACT

The dimensions of a viewing screen are altered to fit the aspect ratio of video being displayed on the viewing screen. A viewing screen includes screen covers which may be displaced horizontally along the viewing screen. If a different aspect ratio video is being displayed, the screen covers are moved horizontally to increase or decrease the viewing area of the viewing screen. The video is then optically resized and shifted to fit the height or width of the screen.

21 Claims, 11 Drawing Sheets

U.S. PATENT DOCUMENTS

| | | | |
|---|---|---|---|
| 6,154,256 | A | 11/2000 | Bruins |
| 6,259,484 | B1* | 7/2001 | Jiang et al. .................... 348/511 |
| 6,366,263 | B1* | 4/2002 | Takasu et al. .................... 345/13 |
| 6,366,706 | B1* | 4/2002 | Weitbruch .................... 382/254 |
| 6,367,933 | B1* | 4/2002 | Chen et al. .................... 353/69 |
| 6,416,186 | B1* | 7/2002 | Nakamura .................... 353/69 |
| 6,473,135 | B1 | 10/2002 | Iwamura |
| 6,486,900 | B1* | 11/2002 | Shen et al. .................... 715/867 |
| 6,499,849 | B1* | 12/2002 | Huang .................... 353/121 |
| 6,511,185 | B1 | 1/2003 | Gananathan |
| 6,591,314 | B1 | 7/2003 | Colbath |
| 6,592,228 | B1* | 7/2003 | Kawashima et al. ......... 353/101 |
| 6,678,009 | B2* | 1/2004 | Kahn .................... 348/569 |
| 6,690,425 | B1 | 2/2004 | Worrell |
| 6,755,540 | B1 | 6/2004 | Runco |
| 6,830,341 | B2 | 12/2004 | Ejiri |
| 6,839,903 | B1* | 1/2005 | Shintani et al. .................... 725/39 |
| 6,857,750 | B2 | 2/2005 | Shimizu |
| 6,922,284 | B1* | 7/2005 | Hou .................... 359/443 |
| 6,932,479 | B2 | 8/2005 | Kobayashi |
| 6,932,480 | B2 | 8/2005 | Wada |
| 6,935,751 | B2 | 8/2005 | Rieche |
| 6,956,625 | B2* | 10/2005 | Kim .................... 348/806 |
| 7,061,552 | B1* | 6/2006 | Patten et al. .................... 348/806 |
| 7,070,283 | B2* | 7/2006 | Akutsu .................... 353/69 |
| 7,125,122 | B2* | 10/2006 | Li et al. .................... 353/31 |
| 7,150,536 | B2* | 12/2006 | Inoue .................... 353/69 |
| 7,167,216 | B2* | 1/2007 | Childers .................... 348/756 |
| 7,170,563 | B2* | 1/2007 | Kojima et al. .................... 348/556 |
| 7,184,093 | B2* | 2/2007 | Manning .................... 348/445 |
| 7,196,733 | B2* | 3/2007 | Aratani et al. .................... 348/581 |
| 7,222,971 | B2* | 5/2007 | Akutsu .................... 353/69 |
| 7,239,354 | B2* | 7/2007 | Moritani .................... 348/445 |
| 7,334,899 | B2* | 2/2008 | Kobayashi .................... 353/69 |
| 7,352,913 | B2* | 4/2008 | Karuta et al. .................... 382/275 |
| 7,461,939 | B2* | 12/2008 | Allen et al. .................... 353/30 |
| 7,466,483 | B2* | 12/2008 | Danthony .................... 359/450 |
| 7,701,518 | B2* | 4/2010 | Chung et al. .................... 348/747 |
| 2002/0057389 | A1* | 5/2002 | Ananian et al. .................... 348/836 |
| 2002/0109794 | A1* | 8/2002 | Bergman .................... 348/841 |
| 2005/0156944 | A1* | 7/2005 | Someya et al. .................... 345/611 |
| 2005/0180858 | A1* | 8/2005 | Halgas, Jr. .................... 417/53 |

* cited by examiner

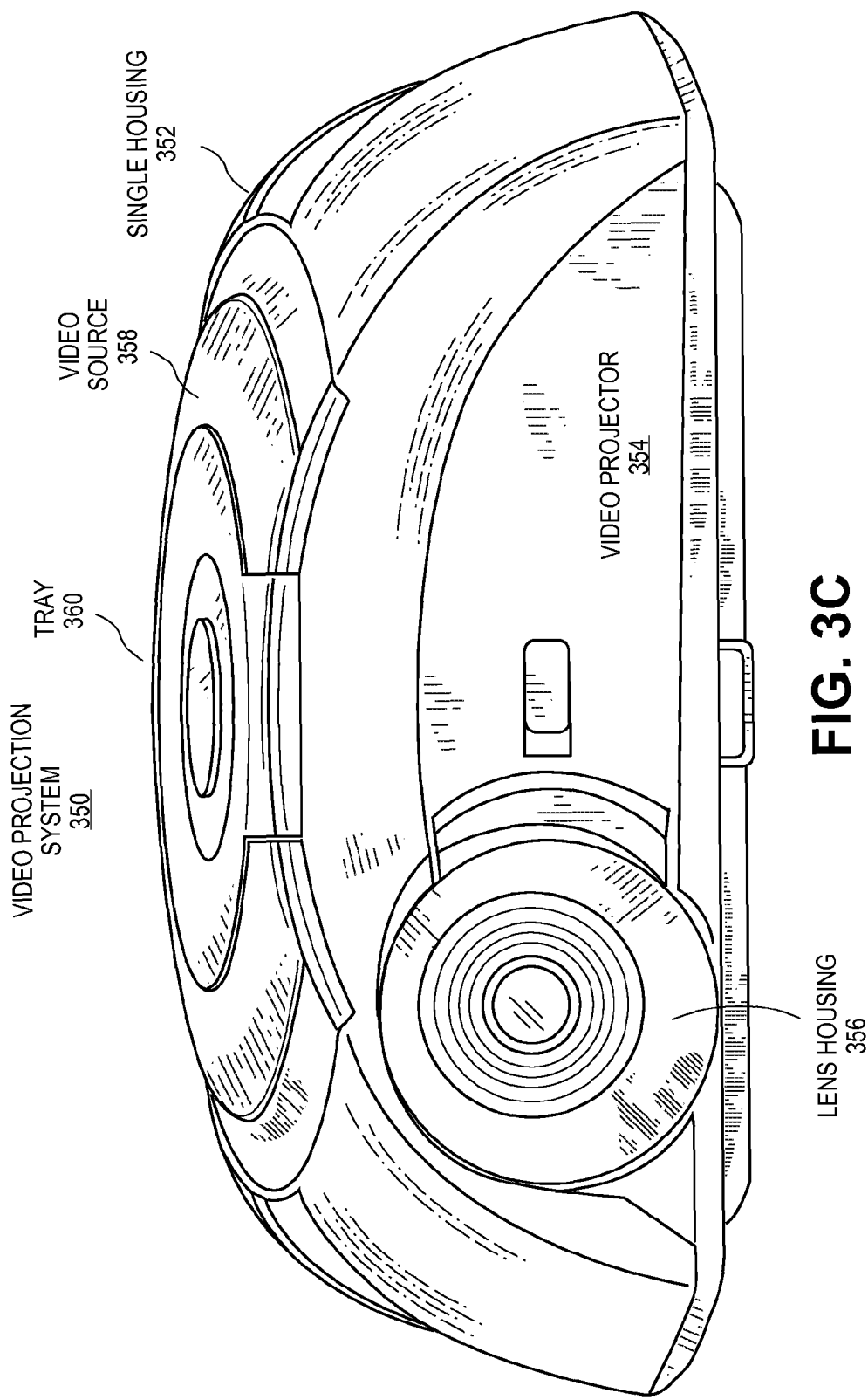

METHODS AND SYSTEMS FOR DISPLAYING VIDEO ON AN ADJUSTABLE SCREEN

CROSS-REFERENCE TO RELATED APPLICATIONS

This application claims priority to U.S. Provisional Patent Application Ser. No. 60/703,433 filed on Jul. 29, 2005, the disclosure of which is incorporated in its entirety by reference herein.

FIELD

Aspects of the present invention generally relate to video display methods and systems.

BACKGROUND

Traditional methods of displaying video in an aspect ratio different than the aspect ratio of the display medium require projecting the image in the middle of the screen and resizing the video. In the traditional methods, since the video's aspect ratio differs from the dimensions of the viewing screen, the video is smaller than the viewing screen. As a result, bars, which are the color of the display screen such as grey, appear at the top and the bottom of the video. Usually, bars differ in color from the video and, thus, may distract a user viewing the video. Further, if the room in which the video is being view has a low ceiling, a user may have difficulty resizing and displaying the video.

SUMMARY

Aspects of the present invention concern a method of displaying video, comprise: projecting the video onto a viewing screen; determining if an aspect ratio of the video matches dimensions of the viewing screen; altering at least one dimension of the viewing screen; optically resizing the video to match at least one dimension of the viewing screen; shifting the video to align the video with the viewing screen; and storing a position of the video in a non-volatile memory.

Further aspects of the present invention concern a system for displaying video, comprise: a video source device for generating a video signal; a video projection device coupled to the video source device for generating a video based on the video signal, the video projection device including a lens capable of shifting video generated by the video projection device and a non-volatile memory for storing a position of the lens; and a video display screen for displaying video generated by the video projection device, the video display screen including at least one screen cover position in front of a portion of a viewing area of the video display screen, wherein the at least one screen cover enables at least one dimensions of the viewing area of the video display screen to be altered.

Further, aspects of the present invention concern a system for displaying video, comprise: means for projecting the video onto a viewing screen, the projecting means comprising: means for optically resizing the video to match at least one dimension of the viewing screen, and means for shifting the video to align the video with the viewing screen; means for altering at least one dimension of the viewing screen; and means for storing a position of the video.

Additional aspects of the present invention will be set forth in part in the description which follows, and in part will be obvious from the description, or may be learned by practice of the invention. The aspects of the present invention will be realized and attained by means of the elements and combinations particularly pointed out in the appended claims.

Further, it is to be understood that both the foregoing general description and the following detailed description are exemplary and explanatory only and are not restrictive of the present invention, as claimed.

The accompanying drawings, which are incorporated in and constitute a part of this specification, illustrate several aspects of the present invention and together with the description, serve to explain the principles of the invention.

BRIEF DESCRIPTION OF THE DRAWINGS

FIGS. 3b-f are various views illustrating an integrated video projector and video source consistent with aspects of the present invention;

FIG. 5 is a flow chart illustrating a method for displaying video consistent with aspects of the present invention.

DETAILED DESCRIPTION

Aspects of the present invention relate to systems and methods for altering the dimensions of a viewing screen to fit the aspect ratio of video being displayed on the viewing screen. A viewing screen includes screen covers which may be displaced horizontally along the viewing screen. If a different aspect ratio video is being displayed, the screen covers may be moved horizontally to increase or decrease the viewing area of the viewing screen. The video may then be optically resized and shifted to fit the height or width of the screen.

Reference will now be made in detail to various aspects of the present invention, examples of which are illustrated in the accompanying drawings. Wherever possible, the same reference numbers will be used throughout the drawings to refer to the same or like parts.

Figure 1:
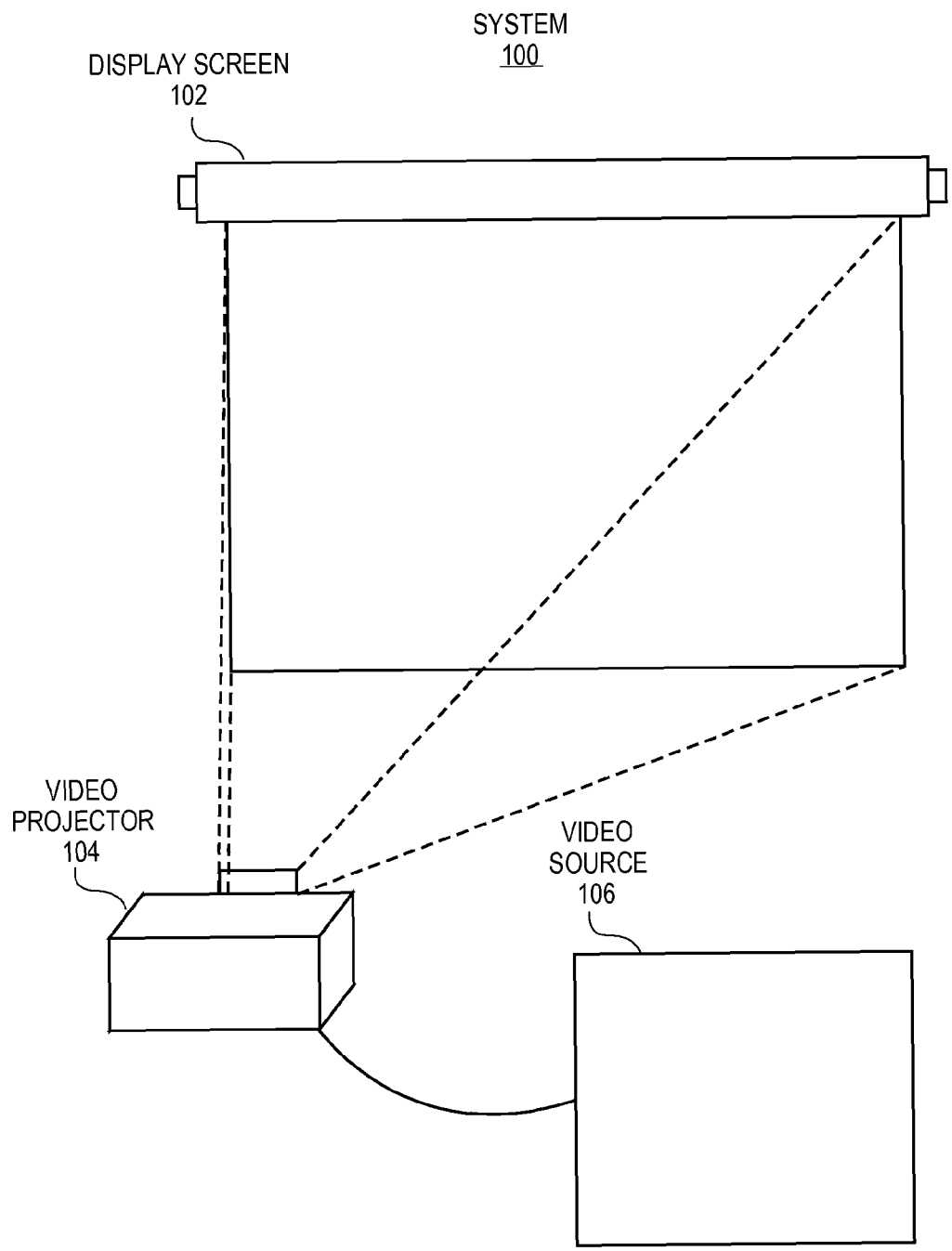
FIG. 1 is a diagram illustrating a system for displaying a video consistent with aspects of the present invention.

FIG. 1 illustrates a system 100 for displaying video consistent with aspects of the present invention. System 100 includes a display screen 102 for viewing video projected from a video projector 104. System 100 further includes a video source 106 which transmits a video signal to video projector 104. The video projected onto display screen 102 may be moving video or still images. Video projector 104 may be any type of video projector capable of receiving a video signal and converting the video signal to a viewable image to be displayed on display screen 102. For example, video projector 104 may be a digital light processing ("DLP") video projector, a liquid crystal ("LCD") video projector, or cathode-ray tube ("CRT") projector.

As illustrated in FIG. 1, video source 106 supplies video projector 104 with a video signal to be displayed on video screen 102. Video source 106 may be any standard video equipment capable of generating a video signal readable by video projector 104. For example, video source 106 may be a Digital Versatile Disk ("DVD") player, laser disk player, Compact Disk ("CD") player, Video CD ("VCD") player, VHS player/recorder, Digital Video Recorder ("DVR"), video camera, video still camera, cable receiver box, or satellite receiver box. Video source 106 may also be a standard laptop or desktop computer. One skilled in the art will realize that the preceding list of standard video equipment is exemplary and video source 106 may be any device capable of generating a video signal readable by video projector 104. Furthermore, video source 106 may be integrated with video projector 104. Additionally, video projector 104 may be coupled to multiple video sources 106.

Figure 2:
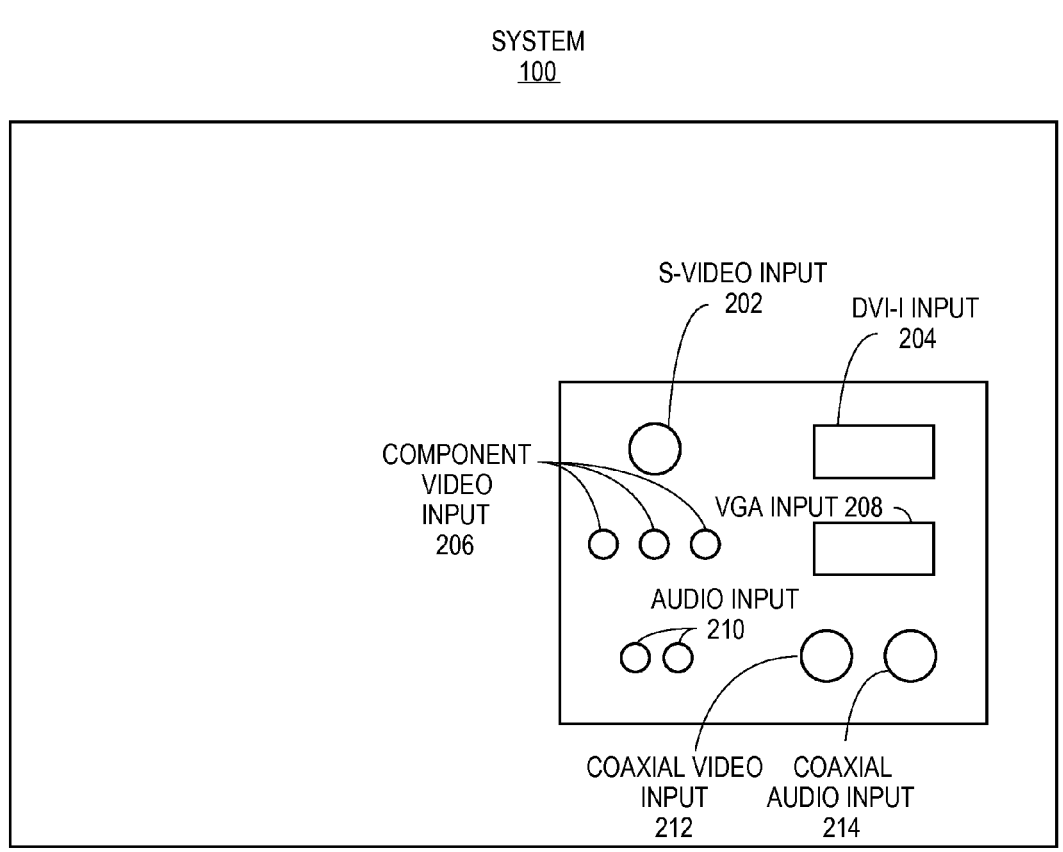
FIG. 2 is a rear view diagram illustrating a system for displaying a video consistent with aspects of the present invention.

FIG. 2 is a back view of video projector 104 illustrating input/output ports 200 for sending and receiving signals consistent with aspects of the present invention. Video source 106 may be coupled to one of the input/output ports 200. As illustrated in FIG. 2, input/output ports 200 include a S-video input 202, DVI-I input 204, component video input 206, VGA input 208, audio input 210, coaxial video input 212, and coaxial audio input 214.

Input/output ports 200 may include additional input and output ports. For example, input/output ports 200 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 200 may include any port capable of sending or receiving an electrical signal. Input/output ports 200 are coupled to the internal components of video projector 104.

Figure 3A:
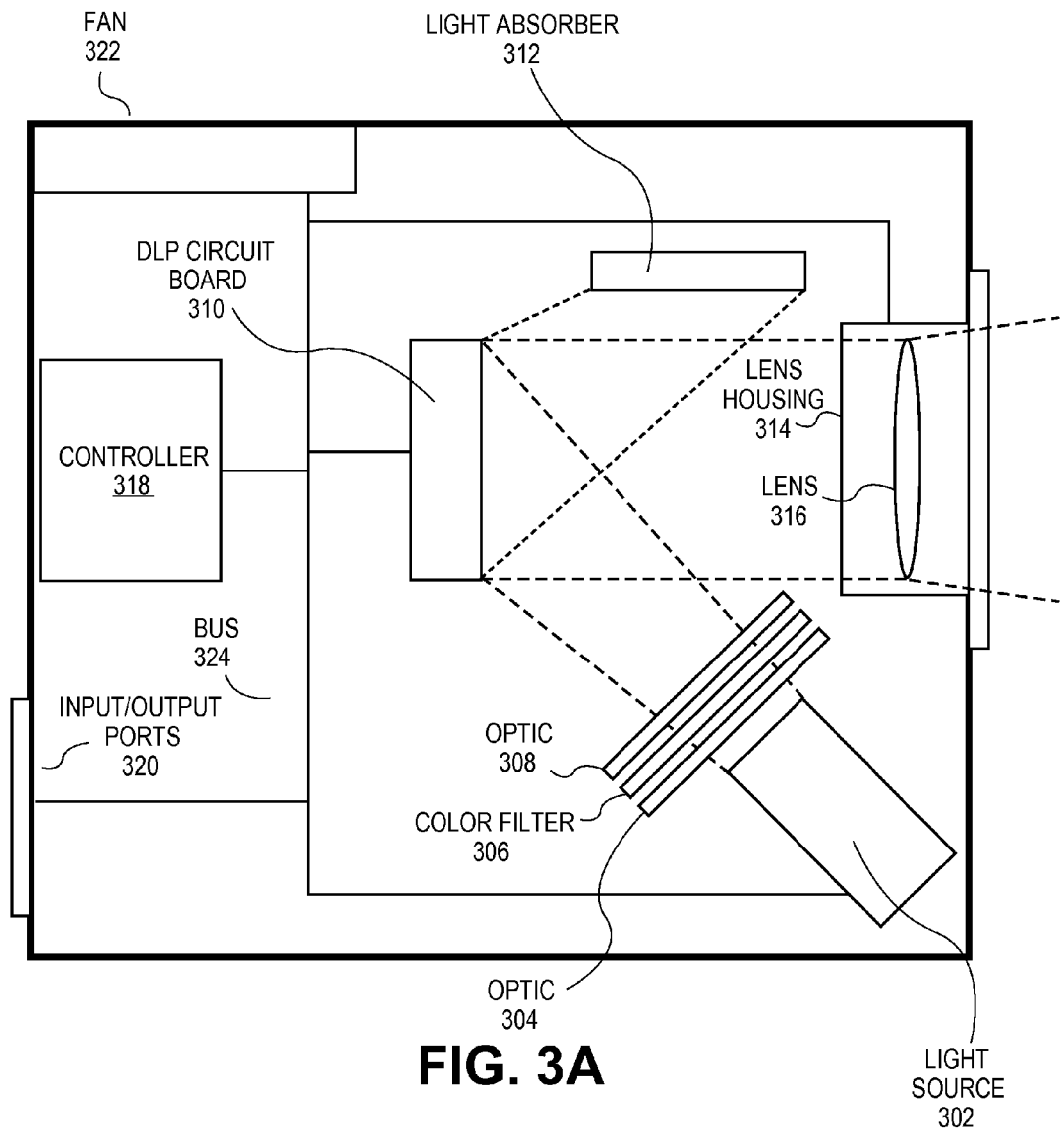
FIG. 3a is a diagram illustrating a DLP video projector consistent with aspects of the present invention.

FIG. 3a illustrates an exemplary DLP video projector 300 which may be used as video projector 104. DLP video projector 300 is an example of one type of projector which may be used with system 100. One skilled in the art will understand that any type of video projector may be used with system 100 such as a CRT projector or an LCD projector.

DLP video projector 300 may include a controller 318 and a bus 324. Controller 318 may include components to control and monitor DLP video projector 300. For example, controller 318 may include a processor, non-volatile memory, and mass storage. All the components of DLP video projector 300 may be coupled to bus 324 to allow all the components to communicate with controller 318 and one another. DLP video projector 300 includes a fan 322 to cool DLP video projector 300. Fan 322 may be coupled to bus 324. DLP video projector 300 also includes a power supply (not shown) coupled to all the components.

DLP video projector 300 contains a light source 302 for generating light to produce a video image. Light source 302 may be, for example, an ultra-high performance ("UHP") lamp capable of producing from 50-500 watts of power. Light source 300 may be coupled to bus 324 to communicate with other components. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

Video projector 300 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on video screen 202. DLP circuit board 310 reflects light not used for the video onto light absorber 312. Light reflected by DLP circuit board 310 used for the video passes through lens housing 314 and lens 316. Lens 316 focuses the video to be displayed on display screen 102. Lens housing 314 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 300 also includes input/output ports 320. Input/output ports 320 may be a single port or multiple ports. Input/output ports 320 enables DLP video projector to receive video signals, receive signals from a remote control device, and output signals to other sources. For example, input/output ports 320 may include ports as illustrated in FIG. 2 or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 320 may include any port capable of sending or receiving an electrical signal. Input/output ports 320 are coupled to bus 324. Signals input into DLP video projector 300 may be transferred to the various components of DLP video projector 300 via bus 324. Likewise, signals output of DLP video projector 300 may be transferred to input/output ports 320 via bus 324.

Figure 3B:
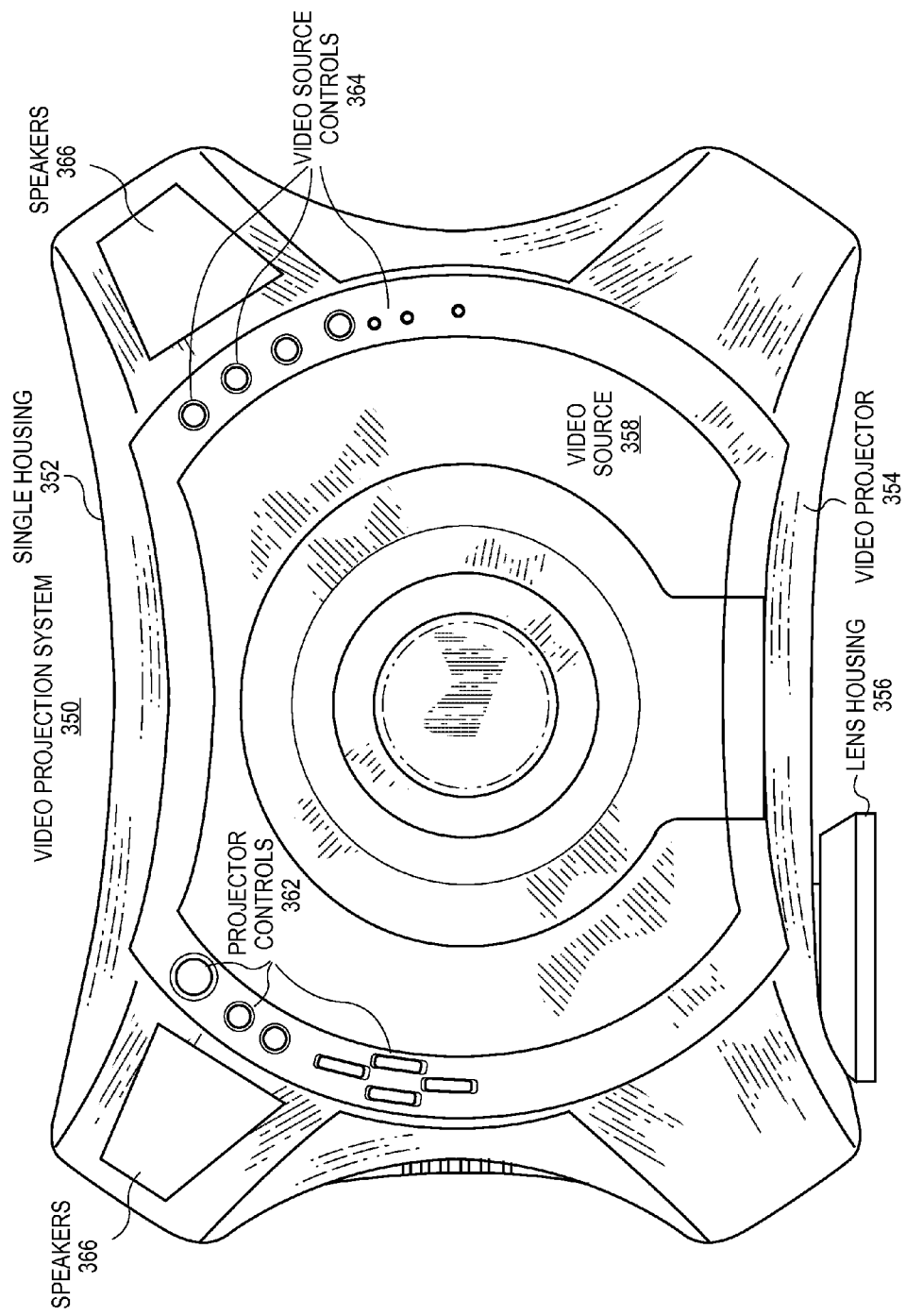

As stated above, video source 106 may be integrated with video projector 104. FIGS. 3b-f are various views of a video projection system 350 which includes a video source and video projector integrated into a single housing 352 consistent with aspects of the present invention. Video projection system 350 may be utilized as system 104 in video system 100. FIG. 3b is a top view of video projection system 350 consistent with aspects of the present invention. As shown in FIG. 3b, video projection system 350 includes video projector 354 and a video source 358 in a single housing. For example, video projector 354 may be a DLP projector and video source 358 may be a DVD player. Video projection system 350 includes a lens housing 356 located in a front portion of video projector 354. Lens housing 356 may include various lens used in projecting video onto a display screen. Further, video source 358 includes a tray 360 for housing media read by video source 358. For example, if video source 358 is a DVD player, tray 360 may house DVD discs.

Further, as illustrated in FIG. 3b, video projection system 350 includes projector controls 362 for operating video projector 354. For example, projector controls 362 may be a power switch, zoom controls, input/output select controls, and picture mode controls. Video projection system 350 also includes video source controls 364. For example, video source controls 364 may be tray open/close controls, play/stop controls, and video search controls for operating video source 358. Video projection system 350 may also be controlled by a remote device (not shown). For example, a remote device may include redundant projector controls 362 and video source controls 364. Video projection system 350 also includes speakers 366 for presenting sounds corresponding to video generated by video projection system 350.

Figure 3D:
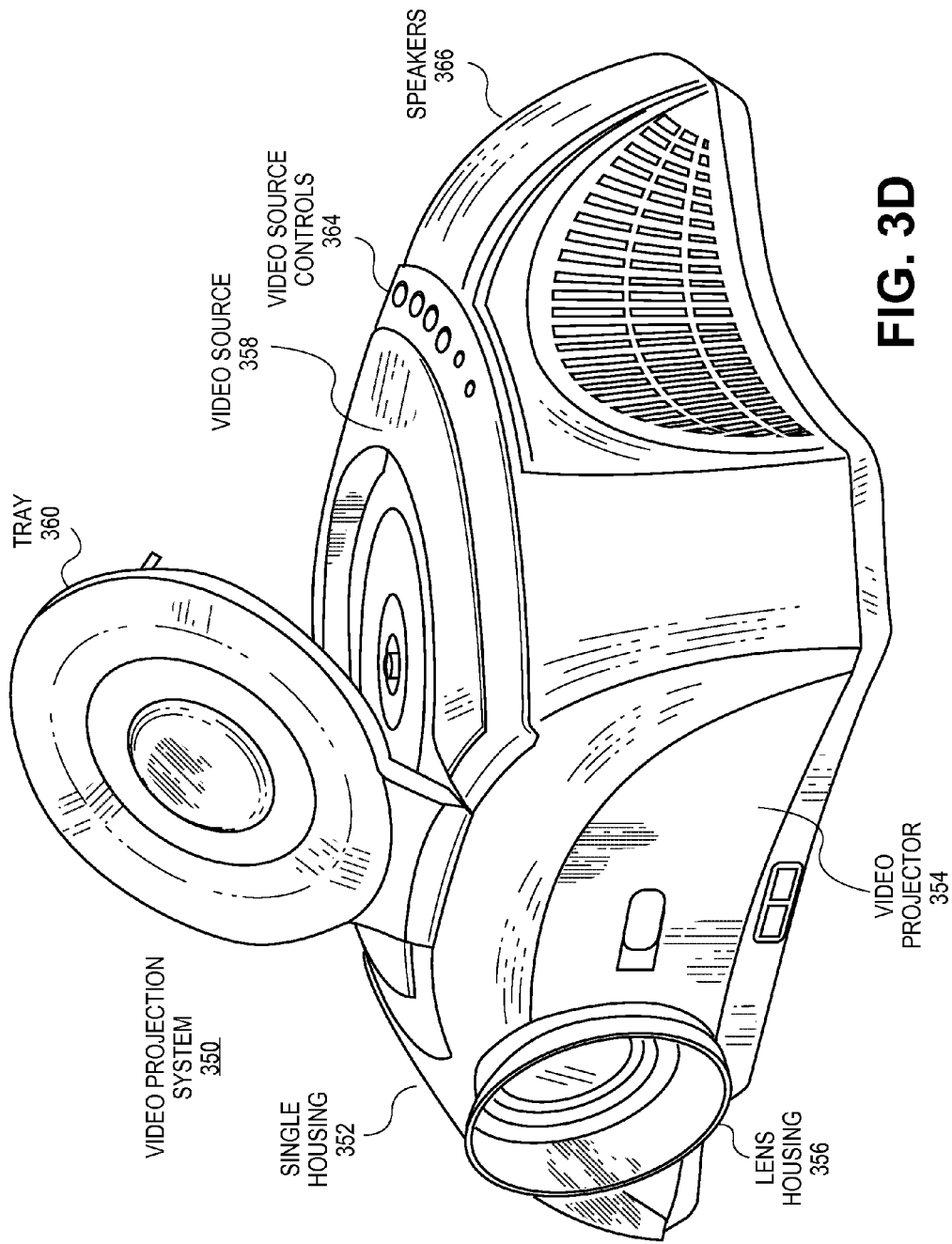

FIG. 3c is a front view of video projection system 350. As shown in FIG. 3c, lens housing 356 is located in the front portion of housing 352 of video projection system 350. Further, video source 358 and tray 360 may be housed in the top portion of housing 352 of projection system 350. FIG. 3d is another front view of video projection system 350. FIG. 3d illustrates video projection system 350 when tray 360 is open for inserting media to be played by video source 358.

Figure 3E:
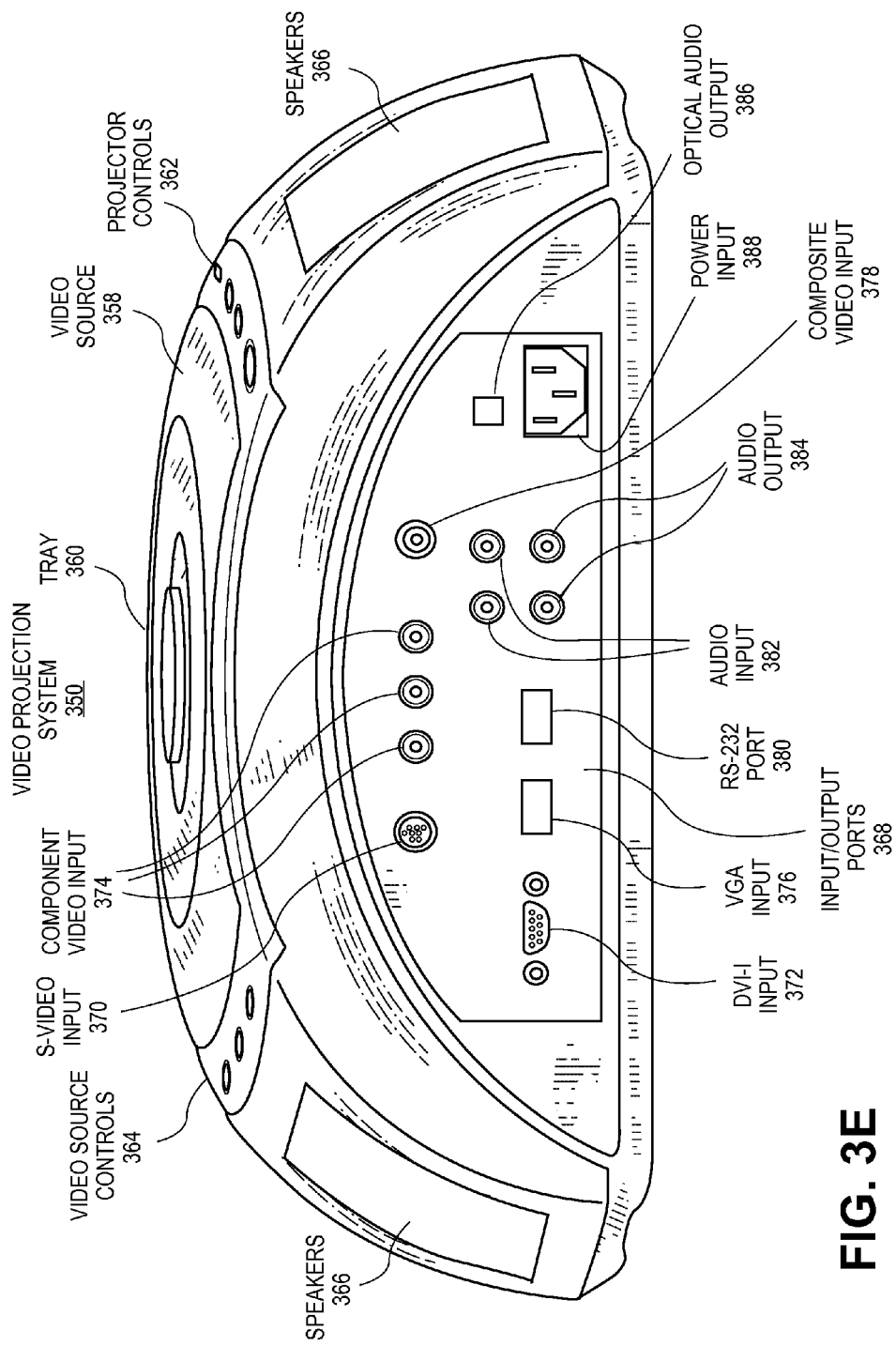

FIG. 3e is a rear view of video projection system 350. As illustrated in FIG. 3e, input/output ports 368 are located in a rear portion of housing 352 of video projection system 350. For example, input/output ports 368 may include an S-video input 370, DVI-I input 372, component video input 374, VGA input 376, composite video input 378, RS-232 port 380, audio input 382, audio output 384, and optical audio output 386, and power input 388. Input/output ports 368 may include additional input and output ports (not shown). For example, input/output ports 368 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal.

Further, as illustrated in FIG. 3e, speakers 366 are located in the sides of the rear portion of housing 352 of video projection system 350. Of course, speakers 366 may also be located in other portions of housing 352. In addition, video projection system 350 may be coupled to other speakers (not shown) that are external to housing 352.

Figure 3F:
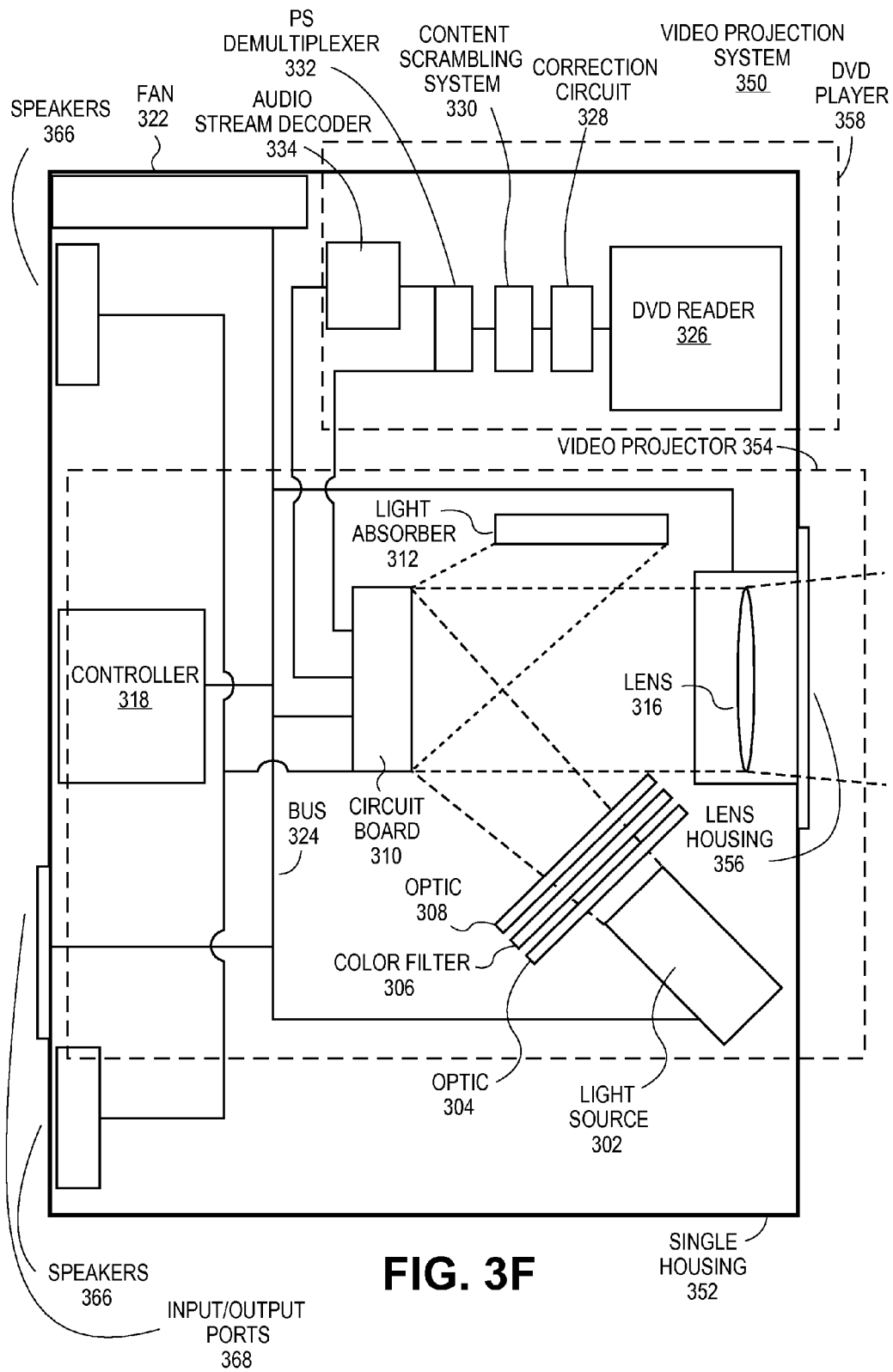

FIG. 3f is a block diagram illustrating internal components of video projection system 350 consistent with aspects of the present invention. As illustrated in FIG. 3f, video projection system 350 includes a DLP video projector 354 and a DVD player 358 integrated into a single housing 352. DLP video projector 354 is an example of one type of projector which may be used with video projection system 350. One skilled in the art would understand that any type of video projector may be used with video projection system 350 such as a CRT projector or an LCD projector. Further, DVD player 358 is an example of one type of video source which may be used with video projection system 350. One skilled in the art will understand that any type of video source may be used with video projection system 350.

DLP video projector 354 may include a controller 318 and a bus 324. Controller 318 may include components to control and monitor DLP video projector 354. For example, controller 318 may include a processor, non-volatile memory, and mass storage. All the components of DLP video projector 354 may be coupled to bus 324 to allow all the components to communicate with controller 318 and one another. DLP video projector 354 includes a fan 322 to cool DLP video projector 354. Fan 322 may be coupled to bus 324. DLP video projector 354 also includes a power supply (not shown) coupled to all the components.

DLP video projector 354 contains a light source 302 for generating light to produce a video image. Light source 302 may be, for example, an UHP lamp capable of producing from 50-500 watts of power. Light source 300 may be coupled to bus 324 to communicate with other component. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

DLP projector 354 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on display screen 102. DLP circuit board 310 reflects light not used for the video onto light absorber 312. Light reflected by DLP circuit board 310 used for the video passes through lens housing 356 and lens 316. Lens 316 focuses the video to be displayed on display screen 102. Lens housing 356 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 354 also includes input/output ports 368. Input/output ports 368 may be a single port or multiple ports. Input/output ports 368 enables DLP video projector 354 to receive video signals, receive signals from a remote control device, and output signals to other sources. For example, input/output ports 368 may include ports as illustrated in FIG. 3e or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal. Input/output ports 368 are coupled to bus 324 and to audio bus 336. Signals input into DLP video projector 354 may be transferred to the various components of DLP video projector 354 via bus 324. Likewise, signals output of DLP video projector 354 may be transferred to input/output ports 368 via bus 324.

DLP video projector 354 also includes DVD player 358. DVD player 358 is composed DVD reader 326. DVD reader 326 may include a spindle motor for turning a DVD disc, a pickup head, and a head amplifier equipped with an equalizer. DVD reader 326 is coupled to a decoder/error correction circuit 328, a content scrambling system 330 for copy protecting DVD contents, a program stream demultiplexer ("PS demultiplexer") 332.

DVD player reads a DVD disc with DVD reader 326 by emitting laser light from the pickup head in order to irradiate the DVD disc with a predetermined wavelength. The reflected light is converted to an electric signal which is then output to the head amplifier. The head amplifier serves to perform signal amplification, waveform shaping and digitization while decoder/error correction circuit 328 serves to perform 8-16 decoding and error correction. Next, content scrambling system 330 performs mutual authentication of the DVD disc and DVD player 358 in order to confirm the authorization.

When the authorization is successfully finished, PS demultiplexer 332 separates the program stream ("PS") as read from the DVD disc into sound and video data in the form of packetized elementary streams ("PES"). Audio stream decoder 334 decodes the PES sound stream with sound compression encoding technology in order to output audio signals. For example, audio stream decoder may utilize sound compression formats such as AAC, AC3, and MPEG. DLP circuit board 310 decodes and processes the video PES which would include video, sub-picture, and navigation data. For example, DLP circuit board 310 may utilize video compression formats such as MPEG 2. The decoded sound stream is transferred to DLP circuit board 310 and DLP circuit board 310 synchronizes sounds, which is transferred to speakers 366 via sound bus 336 and video, which is generated by DLP video projector 354.

One skilled in the art will realize that controller 318 may be utilized in combination with DLP circuit board 310 for producing video and sound from DVD player 358. Further, DLP circuit board 310 or controller 318 may perform audio decoding functions similar to the functions as performed by audio stream decoder 334.

Figure 4:
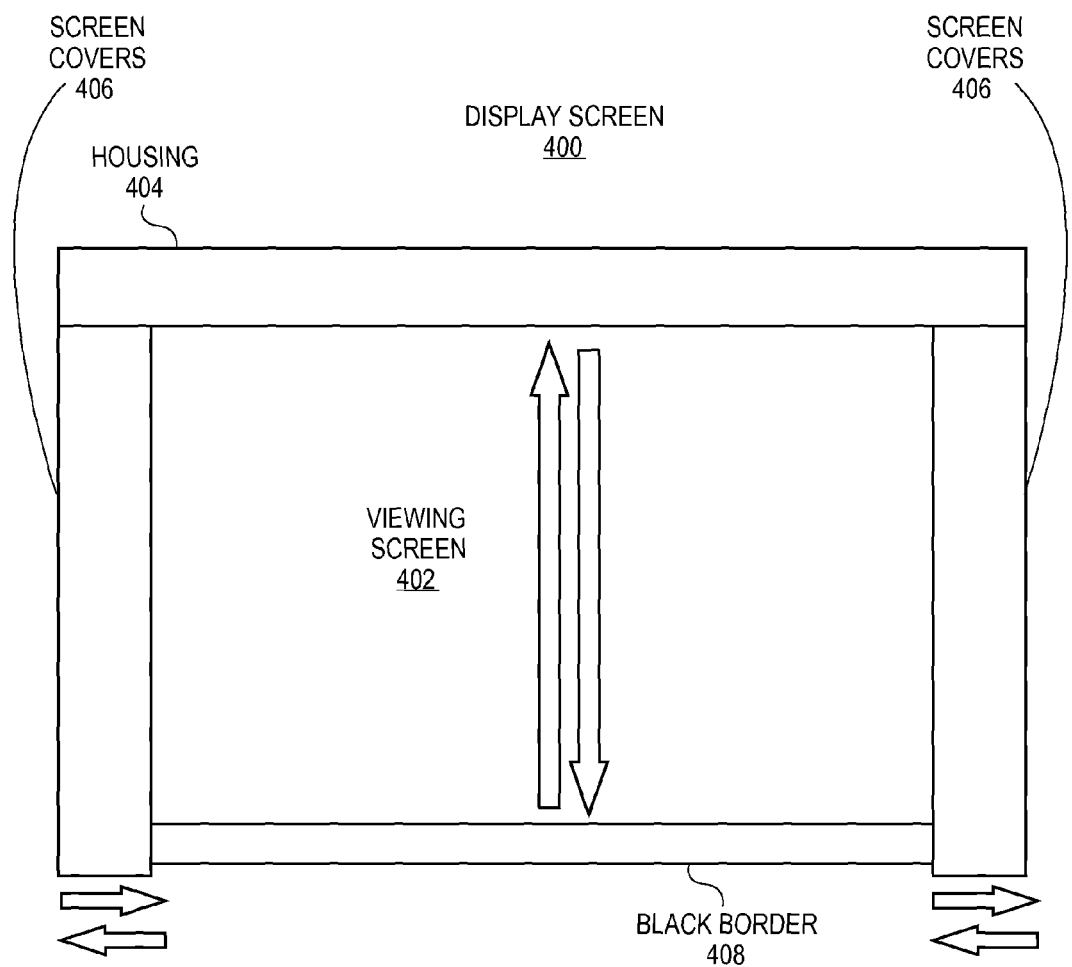
FIG. 4 is a diagram illustrating a display screen consistent with aspects of the present invention.

FIG. 4 illustrates a detailed view of display screen 400 which may be used as display screen 102 consistent with aspects of the present invention. Display screen 400 is merely an example of one type of display screen which may be used with system 100. One skilled in the art will understand that any type of display screen capable of displaying an image may be used with system 100. Display screen 400 includes a viewing screen 402 that retracts into a housing 404. Viewing screen 402 may be constructed of materials that efficiently reflect the video projected from video projector 104. For example, viewing screen 404 may be constructed of a white or gray vinyl fabric, glass beaded fabric, VIDEO SPECTRA fabric, High Contrast fabric, High Power fabric, or any combination thereof. One skilled in the art will realize that the above materials are exemplary and that viewing screen 402 may be constructed of any material or combination of materials that reflects light. Viewing screen 402 includes a black border 408 around all the edges of viewing screen 402. Optionally, a weight (not shown) may be attached to the bottom of viewing screen 402 to stabilize viewing screen 402.

Display screen 400 also includes mounting brackets (not shown) which enable display screen 400 to be attached to a wall or ceiling. Mounting brackets may be located on any surface of housing 404 to facilitate the mounting of display screen 400.

Viewing screen 402 may be manually or electrically retracted into housing 404. If viewing screen 402 is manually retracted, housing 404 contains an inertial locking mechanize and roller (not shown) attached to viewing screen 402. The inertial locking mechanize enables a user to apply force to viewing screen 402 in order to retract or extend viewing screen 402. As the viewing screen 402 retracts, viewing screen 402 is wound around the roller.

If viewing screen 402 is electrically retracted, housing 404 contains an electrical motor and roller (not shown) attached to viewing screen 402. To electrically operate viewing screen 402, current is supplied to the electrical motor to activate the motor and wind viewing screen 402 around the roller in order to retract or extend viewing screen 402 into housing 402. The current supplied to the electrical motor may be controlled by a switch (not shown) located on housing 404. Additionally, a wireless receiver (not shown) may be attached to the electrical motor to enable the electrical motor to be controlled remotely. Additionally, a non-volatile memory may be attached to the motor in order to store different viewing screen positions to be recalled when needed.

Display screen 400 also includes screen covers 406 located on each side of the screen. Screen covers 406 may be manually or electrically moved horizontally along housing 404 to cover portions of viewing screen 402. Screen covers 406 may be constructed of any rigid or flexible material. For example, screen covers 406 may be constructed of a black cloth fabric. One skilled in the art will realize that screen covers 406 are exemplary and that display screen may include an number of screen covers.

If screen covers 406 are manually retracted, housing 404 contains a track (not shown) attached to screen covers 406. The track enables a user to apply force to screen covers 406 in order to move screen covers 406 horizontally along housing 404. For example, if screen covers 406 are constructed of a cloth fabric, the outside edge of each cover would be stationary and the cloth fabric would fold or expand as screen covers 406 are moved horizontally. If screen covers 406 are constructed of a rigid material, screen covers 406 would move outside and inside the dimensions of viewing screen 402 as screen covers 406 are moved horizontally.

If screen covers 406 are electrically retracted, housing 404 contains an electrical motor, track, and pulley and rope or chain system (not shown) attached to screen covers 406. To electrically operate screen covers 406, current is supplied to the electrical motor to activate the motor and move the pulley and rope or chain system in order to move screen covers 406 horizontally along housing 404. For example, if screen covers 406 are constructed of a cloth fabric, the outside edge of each cover would be stationary and the cloth fabric would fold or expand as screen covers 406 are moved horizontally. If screen covers 406 are constructed of a rigid material, screen covers 406 would move outside and inside the dimensions of viewing screen 402 as screen covers 406 are moved horizontally.

The current supplied to the electrical motor may be controlled by a switch (not shown) located on housing 404. Additionally, a wireless receiver (not shown) may be attached to the electrical motor to enable the electrical motor to be controlled remotely. Additionally, a non-volatile memory may be attached to the motor in order to store different screen cover positions to be recalled when needed. One skilled in the art will realize that the above systems for moving screen covers 406 is exemplary and that any type of system to move screen covers 406 horizontally in front of viewing screen 402 may be employed.

Figure 6A:
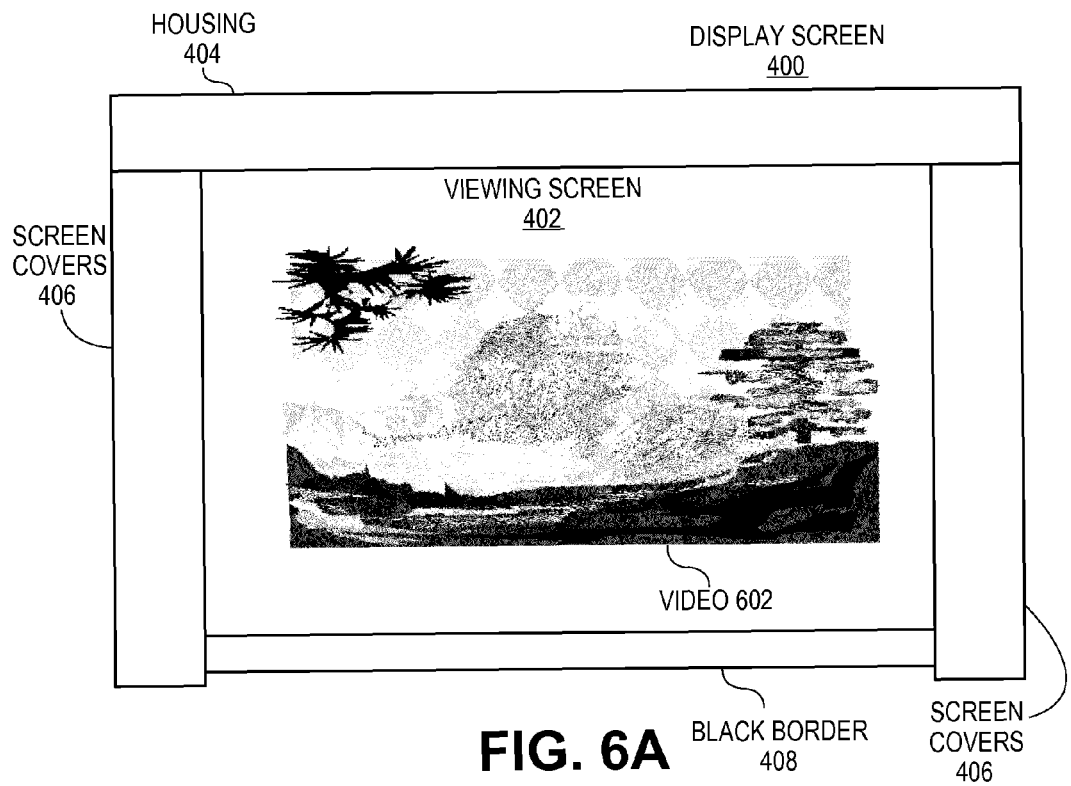
FIGS. 6a-d are diagrams illustrating a method for displaying video consistent with aspects of the present invention.

FIGS. 5 and 6a-d illustrate a method 500 for displaying video utilizing a system 100 consistent with aspects of the present invention. FIG. 5 is a flow chart illustrating the stages in method 500 for displaying video consistent with aspects of the present invention. FIGS. 6a-d are diagrams illustrating viewing screen 400 on which a video 602 is displayed during various stages of method 500 consistent with aspects of the present invention. First, video is projected on display screen 400 to determine if the dimensions of the video are different from the dimensions of viewing screen 402 (stage 502 and 504). If the video's aspect ratio matches the dimensions of viewing screen 402, no adjustment to the video's position or screen size is necessary. If the video's dimensions do not match the dimensions of viewing screen 402, it is determined whether a modified screen dimension, zoom setting, and shifted video position have been previously stored in memory (stage 506). As illustrated in FIG. 6a, video 602 may be smaller than the dimensions of viewing screen 402.

Figure 6B:
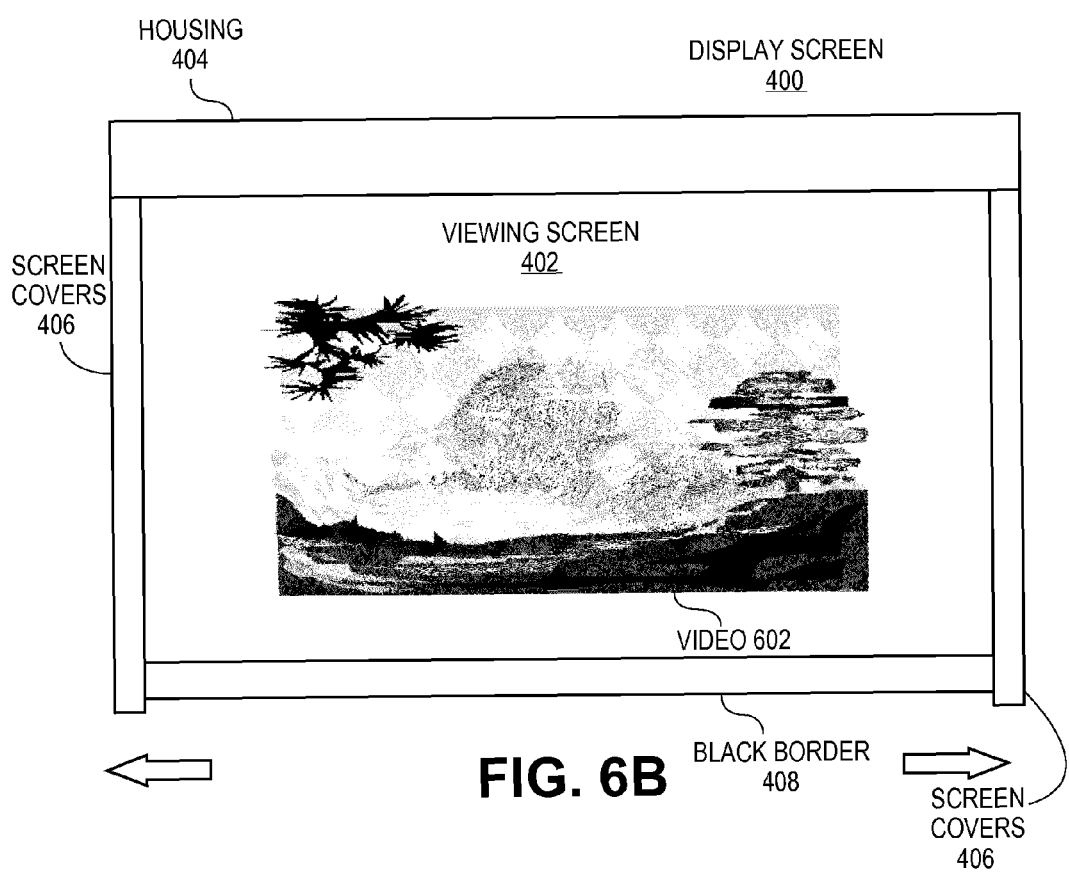

If a modified screen dimension, zoom setting, and shifted video position have not been stored, the viewing screen dimensions, video size, and video position may be modified so that the video fits viewing screen 402. First, screen covers 406 are moved to expose more viewing area of viewing screen 402 (stage 508). As shown in FIG. 6b, screen covers 406 are moved outward to expose more of the surface of viewing screen 402. If screen covers 406 are manually operated, a user may apply force to screen covers 406 until screen covers 406 are displaced to the desired width. If screen covers 406 are electrically operated, screen covers 406 may be displaced using a switch located on display screen 400 or a remote in communication with display screen 400.

Figure 6C:
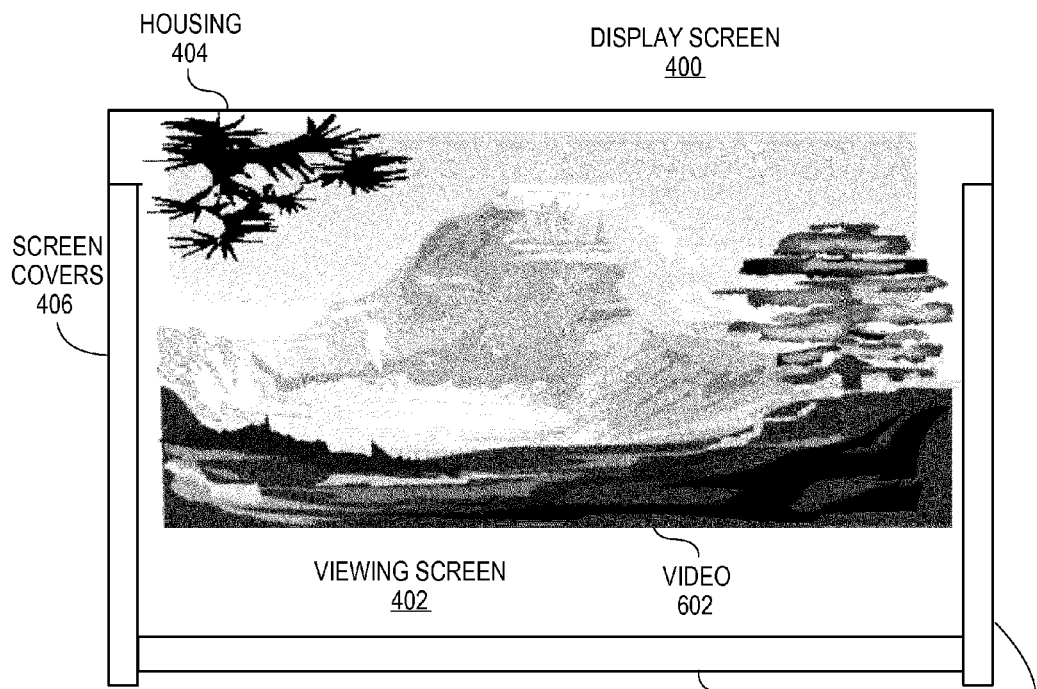
Figure 6D:
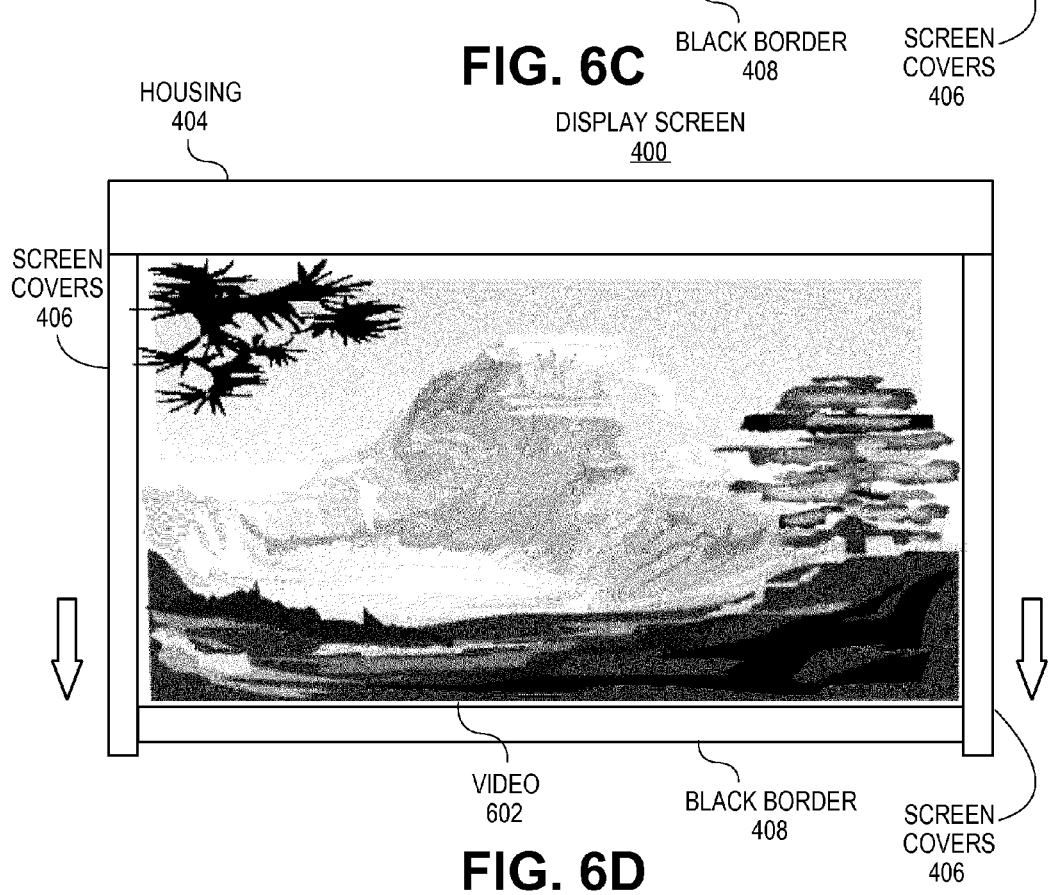

Then, video projector 104 optically resizes the video by zooming in order to match the width of viewing screen 402 (stage 510). As illustrated in FIG. 6c, video 602 size in increased by optically zooming. Next, video projector 104 shifts the video by moving a lens inside of video projector 104 in order to match the viewing screen height (stage 512). For example, if DLP video projector 300 or 350 is used, lens 316 inside lens housing 314 or 356 is shifted. As illustrated in FIG. 6d, video 602 is shifted downward until the bottom of video 602 is aligned with border 408.

Once the video has been shifted to match the viewing screen height, the optical resize setting and the shifted lens position may be stored in non-volatile memory in video projector 104 (stage 514). For example, if DLP video projector 300 or 350 is being utilized, the shifted position of lens 314 may be stored in the non-volatile memory in controller 318 or in the memory contained on DLP circuit board 310. Additionally, if display screen 400 is electrically operated, the displaced position of screen covers 406 may be stored in non-volatile memory located in housing 404 (stage 516). Once the optical resize setting, shifted video position, and viewing screen resize are stored in memory, the video and viewing screen may be easily adjusted to match the aspect ratio of the video next time video projector 104 generates video (stage 518).

Additionally, the optical resize setting, shifted video position, and viewing screen resize may be stored in the same memory. For example, the optical resize setting, the shifted position of lens 316, and the displaced position of screen covers 406 may be stored in the non-volatile memory in controller 318 or the memory of DLP circuit board 310. Accordingly, when the optical resize setting, the shifted position of lens 316, and the displaced position of screen covers 406 are recalled (stage 518), controller 318 may communicate the displaced position of screen covers 406 to display screen 400 via input/output ports 320 or 368.

In the above method, viewing screen 402 is not retracted vertically. However, optionally, viewing screen 402 may be retracted or extended vertically to fit the height of any image being displayed. Further, one skilled in the art will realize that covers 406 may be extended or retracted in any amount or manner to fit video 602.

Other aspects of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of displaying a video, comprising:
projecting the video onto a viewing screen having at least one screen cover located in front of the viewing screen;
determining, after the video is projected onto the viewing screen, if a height dimension and a width dimension of the video that was projected onto the viewing screen matches a height dimension and a width dimension of the viewing screen;
altering, after the determination that either the height dimension or the width dimension of the projected video does not match the height dimension and the width dimension of the view screen, one of the height dimension and the width dimension of the viewing screen while keeping the other of the height dimension and the width dimension constant by moving the at least one screen cover in front of the viewing screen with respect to the viewing screen when an aspect ratio of the video based on the height dimension and the width dimension of the video does not match the aspect ratio of the viewing screen, wherein the at least one screen cover is continuously displaced from a corresponding edge of the viewing screen when the at least one screen cover moves toward a center portion of the viewing screen and the at least one screen cover is continuously displaced from the corresponding edge of the viewing screen when the at least one screen cover moves away from the center portion of the viewing screen;
determining, after the altering, whether a width of the video matches the width dimension of the viewing screen;
zooming the width of the video in response to the width of the video not matching the width dimension of the viewing screen;
shifting the video to an alignment position through aligning a height of the video with the height dimension of the viewing screen, wherein the video is projected onto the alignment position in the viewing screen; and
storing the alignment position of the video in a non-volatile memory.

2. The method of claim 1, wherein shifting the video comprises moving a lens in a projector projecting the video.

3. The method of claim 1, wherein the at least one screen cover is horizontally displaced in front of the viewing screen.

4. The method of claim 1, wherein moving the at least one screen cover comprises electrically moving the at least one screen cover.

5. The method of claim 1, wherein moving the at least one screen cover comprises manually moving the at least one screen cover.

6. The method of claim 1, wherein storing the position of the video in a non-volatile memory device, comprises storing a position of a lens in a projector projecting the video in the non-volatile memory.

7. The method of claim 6, further comprising storing the at least one altered dimension of the viewing screen in a non-volatile memory.

8. The method of claim 1, wherein the at least one screen cover is vertically displaced in front of the viewing screen.

9. The method of claim 1, further comprising:
determining whether previous information associated with the video is stored in the non-volatile memory, wherein the previous information comprises at least one of a modified screen dimension, a zoom setting, or a shifted video position.

10. A system for displaying a video, comprising:
a video source device for generating a video signal;
a video projection device coupled to the video source device for projecting the video based on the video signal that was generated by the video source device, the video projection device comprising a lens capable of zooming and shifting the video projected by the video projection device and a non-volatile memory for storing a position of the lens; and
a video display screen for displaying the video projected by the video projection device, the video display screen comprising at least one screen cover positioned in front of a portion of a viewing area of the video display screen, wherein the at least one screen cover enables one of a height dimension and a width dimension of the viewing area of the video display screen to be altered while keeping the other of the height dimension and the width dimension constant by moving the at least one screen cover in front of the video display screen with respect to the video display screen when an aspect ratio of the video based on a video dimension projected on the video display screen does not match the height dimension and the width dimension, and when the video does not match the at least one of the height dimension or the width dimension of the video display screen, wherein the at least one screen cover is continuously displaced from a corresponding edge of the video display screen when the at least one screen cover moves toward a center portion of the video display screen and the at least one screen cover is continuously displaced from the corresponding edge of the video display screen when the at least one screen cover moves away from the center portion of the video display screen, and wherein the lens is configured to zoom a width of the video in response to the width of the video not matching the width dimension of the viewing area of the video display screen, and shift the video to an alignment position through aligning a height of the video with the height dimension of the video area of the video display screen, wherein the video projection device comprises a non-volatile memory arranged to store the alignment position and wherein the video is projected onto the alignment position in the viewing screen.

11. The system of claim 10, wherein the video display screen comprises a non-volatile memory for storing a position of the at least one screen cover.

12. The system of claim 10, wherein the video source device and the video projection device, are contained in a single housing.

13. The system of claim 10, wherein the video source device is a digital video player and the video projection device is a DLP video projector.

14. The system of claim 13, wherein the video source device and the video projection device are contained in a single housing.

15. The system of claim 10, wherein the video display screen comprises a retracting device for moving the video display screen vertically.

16. The system of claim 15, wherein the retracting device comprises a memory for storing a vertical position of the video display screen.

17. The system of claim 10, wherein the video projection device is configured to determine whether previous information associated with the video is stored in the non-volatile memory, wherein the previous information comprises at least one of a modified screen dimension, a zoom setting, or a shifted video position.

18. A system for displaying a video, comprising:
means for projecting the video onto a viewing screen having at least one screen cover located in front of the viewing screen, the projecting means comprising:
means for determining, after the video is projected on the viewing screen, if a height dimension and a width dimension of the video that was projected onto the viewing screen matches a height dimension and a width dimension of the viewing screen;
means for altering, after the determination that either the height dimension or the width dimension of the projected video does not match the height dimension and the width dimension of the view screen, one of the height dimension and the width dimension of the viewing screen while keeping the other of the height dimension and the width dimension constant by moving the at least one screen cover in front of the viewing screen with respect to the viewing screen when an aspect ratio of the video based on the height dimension and the width dimension of the video does not match the aspect ratio of the viewing screen, wherein the at least one screen cover is continuously displaced from a corresponding edge of the viewing screen when the at least one screen cover moves toward a center portion of the viewing screen and the at least one screen cover is continuously displaced from the corresponding edge of the viewing screen when the at least one screen cover moves away from the center portion of the viewing screen;
means for determining whether a width of the video matches the width dimension of the viewing screen;
means for zooming the width of the video in response to the width of the video not matching the width dimension of the viewing screen;
means for shifting the video to an alignment position through aligning the height of the video with the height dimension of the viewing screen, wherein the video is projected onto the alignment position in the viewing screen; and
means for storing the alignment position of the video.

19. The system of claim 18, further comprising means for storing altered dimensions of the viewing screen.

20. The system of claim 18, wherein the projecting means further comprises means for reading a video source.

21. The system of claim 18, further comprising means for determining whether previous information associated with the video, is stored in memory, wherein the previous information comprises at least one of a modified screen dimension, a zoom setting, or a shifted video position.

* * * * *